United States Patent
Generazio (10) Patent No.: US 10,900,930 B2
(45) Date of Patent: Jan. 26, 2021

(54) METHOD FOR PHONON ASSISTED CREATION AND ANNIHILATION OF SUBSURFACE ELECTRIC DIPOLES

(71) Applicant: U.S.A. AS REPRESENTED BY THE ADMINISTRATOR OF THE NASA, Washington, DC (US)

(72) Inventor: Edward R. Generazio, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 78 days.

(21) Appl. No.: 15/647,553

(22) Filed: Jul. 12, 2017

(65) Prior Publication Data
US 2018/0017527 A1    Jan. 18, 2018

Related U.S. Application Data

(60) Provisional application No. 62/448,130, filed on Jan. 19, 2017, provisional application No. 62/362,815, filed on Jul. 15, 2016.

(51) Int. Cl.
*G01N 27/00* (2006.01)
*G01N 27/60* (2006.01)

(52) U.S. Cl.
CPC .......... *G01N 27/60* (2013.01); *G01N 27/007* (2013.01)

(58) Field of Classification Search
CPC ...................................................... G01N 27/60
See application file for complete search history.

(56) References Cited

U.S. PATENT DOCUMENTS

| | | |
|---|---|---|
| 3,273,397 A | 9/1966 | Forward |
| 4,931,740 A | 6/1990 | Hassanzadeh et al. |
| 5,019,804 A | 5/1991 | Fraden |
| 5,164,673 A | 11/1992 | Rosener |
| 5,430,381 A | 7/1995 | Dower |

(Continued)

FOREIGN PATENT DOCUMENTS

| | | |
|---|---|---|
| GB | 2132357 A | 7/1984 |
| WO | 2002067015 A1 | 8/2002 |
| WO | 2008152588 A2 | 12/2008 |

OTHER PUBLICATIONS

U.S. Appl. No. 15/177,798 to Generazio. (filed Jun. 9, 2016).

(Continued)

*Primary Examiner* — Noam Reisner
(74) *Attorney, Agent, or Firm* — Shawn P. Gorman; Jonathan B. Soike; Helen M Galds (57) ABSTRACT

Methods and systems are disclosed for dynamically creating and annihilating subsurface electric dipoles having variable strength and variable alignment. The ability of various embodiments to create, annihilate, and control subsurface dipoles may be a useful technology for wide variety of applications including the nondestructive testing of materials and structures, for generating and receiving directed and omni-directional variable amplitude and frequency transmission waves without the need for conductive antennas, for phonon to electromagnetic power conversion, for materials and manufacturing process control, atomic and nanoparticle alignment, and for control and utilization as medical therapies.

19 Claims, 8 Drawing Sheets

(56) References Cited

U.S. PATENT DOCUMENTS

| | | | |
|---|---|---|---|
| 5,986,456 A | 11/1999 | Yamashita | |
| 6,025,726 A | 2/2000 | Gershenfeld et al. | |
| 6,031,378 A | 2/2000 | Rosin | |
| 6,645,144 B1* | 11/2003 | Wen | G01N 29/0609 600/407 |
| 6,661,115 B2 | 12/2003 | Lester | |
| 6,661,232 B1 | 12/2003 | Horiguchi | |
| 6,762,726 B2 | 7/2004 | Alden | |
| 6,842,697 B1* | 1/2005 | Millar | G01V 3/265 702/2 |
| 7,119,553 B2 | 10/2006 | Yang et al. | |
| 7,154,275 B2 | 12/2006 | Zank et al. | |
| 7,242,298 B2 | 7/2007 | Cehelnik | |
| 7,295,019 B2 | 11/2007 | Yang et al. | |
| 7,330,032 B2 | 2/2008 | Donnangelo | |
| 7,471,089 B2 | 12/2008 | Zerilli et al. | |
| 9,279,719 B2 | 3/2016 | Generazio | |
| 2006/0071669 A1 | 4/2006 | Funato et al. | |
| 2006/0164094 A1 | 7/2006 | Golder et al. | |
| 2007/0040545 A1 | 2/2007 | Takiguchi | |
| 2008/0246485 A1 | 10/2008 | Hibbs et al. | |
| 2008/0303530 A1 | 12/2008 | Coutsornitros et al. | |
| 2009/0284405 A1 | 11/2009 | Salmon et al. | |
| 2009/0295366 A1 | 12/2009 | Cehelnik | |
| 2009/0295644 A1 | 12/2009 | Curran et al. | |
| 2009/0309604 A1 | 12/2009 | Zhang | |
| 2010/0095257 A1* | 4/2010 | Koshiishi | G06F 30/367 716/106 |
| 2010/0250140 A1 | 9/2010 | Constable et al. | |
| 2010/0259272 A1 | 10/2010 | Care | |
| 2010/0271291 A1 | 10/2010 | Care | |
| 2011/0062968 A1 | 3/2011 | Renno et al. | |
| 2012/0013354 A1 | 1/2012 | Bowler | |
| 2012/0092019 A1 | 4/2012 | Blum | |
| 2012/0199755 A1 | 8/2012 | Generazio | |
| 2014/0104980 A1* | 4/2014 | Sava | G01V 11/007 367/14 |
| 2014/0125358 A1 | 5/2014 | Dawson et al. | |
| 2014/0346058 A1 | 11/2014 | Robitzki et al. | |
| 2015/0137825 A1 | 5/2015 | Generazio | |
| 2015/0298174 A1* | 10/2015 | Bibl | B06B 1/0644 310/316.01 |
| 2016/0049885 A1 | 2/2016 | Generazio | |

OTHER PUBLICATIONS

Jackson, John D., "Classical Electrodynamics," Third Edition Book, 1999, Hoboken, New Jersey, United States: John Wiley & Sons.

Generazio, E. R., "Electric Potential and Field Imaging with Applications," Materials Evaluation, Nov. 2015, pp. 1479-148, vol. 73, No. 11.

https://ocw.mit.edu/resources/res-6-002-electromagnetic-field-a-problem-solving-approach-spring-2008/textbook-contents/—Chapter 3, p. 143, Accessed.

Generazio, E. R. et al., "Free-Carrier Absorption in Quantizing Magnetic Fields," Physical Review B, Dec. 15, 1979, pp. 5162-5167, vol. 20, No. 12.

AlphaLab Inc. "The TriboElectric Series" https://www.trifield.com/content/tribo-electric-series/. Visited at least as early as Oct. 2016.

Halliday, D. et al., "Fundamentals of Physics," 2005, pp. 421-423, Hoboken, John Wiley & Sons, Inc., New Jersery.

Horowitz, Paul and Hill, Winfield, "The Art of Electronics", 2nd Ed., Cambridge University Press, pp. 113-173, 1989.

Fairchild Semiconductor Corporation, Junction Field Effect Transistor (JFET), http://www.fairchildsemi.com/ds/mp/mpf102.pdf, 2004.

* cited by examiner

METHOD FOR PHONON ASSISTED CREATION AND ANNIHILATION OF SUBSURFACE ELECTRIC DIPOLES

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

OVERVIEW

The present disclosure relates to remote object identification and characterization, and more particularly to sensors for identification and characterization using electrostatic charging and electric potential changes.

Characterization of remote hidden objects may be performed using ultrasonic, eddy current, x-ray radiography, thermal, neutron radiography, terahertz imaging, and microwave based technologies. These inspection technologies work well when there are voids, inclusions, disbonds, cracks, or large changes in density or dielectric properties of the hidden object. However, these inspection technologies generally fail to be adequate when there are subtle changes in dielectric or electric properties of a hidden object, materials of a hidden object and the surrounding structure hiding the hidden object are of similar densities, very thin materials make up the hidden object, and for complex or hybrid structures hiding a hidden object.

SUMMARY

One or more embodiments of the present disclosure provide systems and methods to dynamically create and annihilate subsurface electric dipoles having variable strength and variable alignment. The ability of various embodiments to create, annihilate, and control subsurface dipoles may be a useful technology for wide variety of applications including the nondestructive testing of materials and structures, for generating and receiving directed and omni-directional variable amplitude and frequency transmission waves without the need for conductive antennas, for phonon to electromagnetic power conversion, for materials and manufacturing process control, atomic and nanoparticle alignment, and for control and utilization as medical therapies.

One or more embodiments of the present disclosure may provide systems and methods for characterizing objects, including a phonon generation source, and an imaging array, such as an electric potential imaging array or an electric field imaging array, wherein the phonon generation source is configured to propagate phonons into an object comprising two materials while the imaging array generates one or more electric potential images of the object from which electric field components may be determined and imaged.

These and other aspects of the present disclosure will be further understood and appreciated by those skilled in the art by reference to the following specification, claims, and appended drawings.

DETAILED DESCRIPTION

Aspects of the present disclosure address challenges including those discussed above, and may be applicable to a variety of applications, devices, systems, and methods for identifying and characterizing hidden objects. These and other aspects of the present disclosure are exemplified in a number of implementations and applications, some of which are shown in the figures and characterized in the claims section that follows. It should be noted that the figures may not be drawn to scale and that the elements of similar structures or functions are represented by like reference numerals throughout the figures. It should be noted that the figures are only intended to facilitate the description of the features. They are not intended as an exhaustive description of the disclosed embodiments or as a limitation on the scope of the claimed invention. In addition, a disclosed embodiment need not have all the aspects or advantages shown or described herein. An aspect or an advantage described in conjunction with a particular embodiment is not necessarily limited to that embodiment and can be practiced in any other embodiments even if not so illustrated.

Some inspection technologies, such as ultrasonic, eddy current, x-ray radiography, thermal, neutron radiography, terahertz imaging, and microwave based inspection technologies, may not be sensitive to triboelectric properties.

The electric potential and field emanating from subsurface triboelectrically charged objects maybe quantitatively characterized and imaged, for example, using physical contact with objects of interest or by charge injection to characterize subsurface materials. The various embodiments extend electric potential and field quantitative characterization and imaging to provide the capability to remotely dynamically create and annihilate subsurface electric dipoles having variable strength and variable alignment. The various embodiments may allow for interrogation of subsurface bonded components and determination of the quantitative degree of bonding. The ability to create, annihilate, and control subsurface dipoles may be a useful technology for wide variety of applications. Some example applications include, the nondestructive testing of materials and structures, tagging of subsurface material components, for generating and receiving directed and omni-directional variable amplitude and frequency transmission waves without the need for conductive antennas, phonon to electromagnetic power conversion, materials and manufacturing process control, atomic and nanoparticle alignment, and control and utilization as medical therapy. One or more embodiments may generate variable strength subsurface electric dipoles using phonon excitation. Some various applications of the one or more embodiments generate variable strength subsurface electric dipoles using phonon excitation and may include as an inspection method and/or may be applied for use as a therapeutic technology.

Electric dipoles may be used by transmission antenna systems and electric microphones. There has been limited work trying to control electric dipoles affecting the build-up of nano-structures in electronic systems. However, these activities do not address the concept of generating dipoles in place or in an ephemeral manner. One or more embodiments provide a method of generating or creating dipoles in regions of interest for a specified purpose and then these dipoles are annihilated by the host material. One of more embodiments may also provide a method for generating the dipoles based on phonon-surface potential interactions leveraging the triboelectric affinity of materials. In some embodiments, observation and control of the created dipoles allow dipole field to be measured and made visible using electric potential and/or electric field imaging technology. By varying the amplitude of the phonon the subsurface bonded, partially bonded, and/or, in contact but not necessarily bonded, systems are uniquely and quantitatively characterized for bonding potentials.

The various embodiments may be useful for wide variety of applications including, for example, nondestructive testing of materials and structures, for generating and receiving directed and omni-directional variable amplitude and frequency transmission waves without the need for conductive antennas and having dimension several orders of magnitude smaller than existing antennas, for phonon to electromagnetic power conversion, for materials and manufacturing process control, for control of atomic and nanoparticle alignment in nanosystems, for control and utilization as medical therapy, and/or for quantitatively characterizing subsurface bonding potentials in complex materials.

Figure 1A:
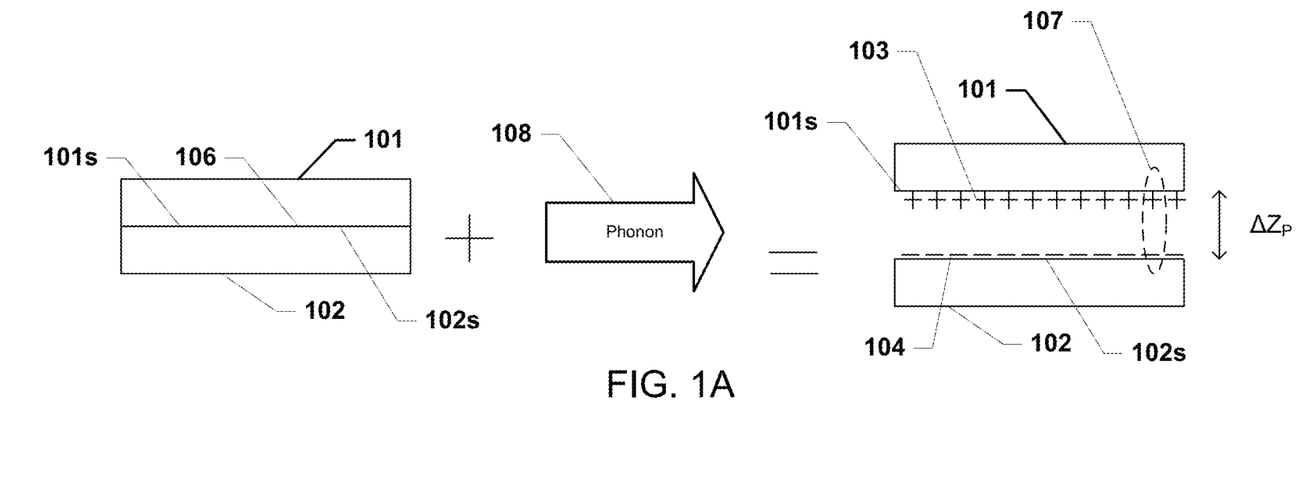
FIG. 1A is a block diagram illustrating triboelectric charging of dissimilar materials, consistent with one or more embodiments of the present disclosure.

FIG. 1A is a block diagram illustrating triboelectric charging of dissimilar materials 101 and 102. When two surfaces 101 and 102s of dissimilar materials, 101 and 102 respectively, come into momentary contact or near contact to produce an interface 106, electric charges or free carriers are exchanged so that surface 101s of material 100 takes on an electrical charge and the surface 102s of material 102 takes on an opposite charge. The degree to which materials take on an electrical charge is identified by the triboelectric affinity of the materials in momentary contact. This process is commonly referred to triboelectric charging. Triboelectric charging is a major contributor to electrostatic discharge. Materials used herein may be formed from materials that do not support surface charges, both bound and unbound, or images charges. The materials may be triboelectrically neutral, have a low electric susceptibility, and may be electrically non-conductive.

While illustrated as solid dissimilar materials 101 and 102 in momentary contact or near contact, the materials 101 and 102 may have other characteristics. For example, the surfaces 101s and 102s need not be solid. As another example, the time in contact or near contact may not be momentary. As further examples, materials 101 and 102 and their surfaces may not be dissimilar and that interface 106 may be established even when material 101 and 102 are originally identical. As another example, material 101 and material 102 may be the same bulk material where a separation interface 106 is created, for example as fatigue crack or other interface 106, between the two materials 101 and 102 at some time.

After triboelectric charging, for example, a positive charge 103 is on the surface 101s of material 101 and at a distance $\Delta Z_P$ from the surface 102s and a negative charge 104 is on the surface 102s of material 102. The distance $\Delta Z_P$ is often macroscopic, for example, as one demonstrates triboelectric charging by rubbing a glass rod with a silk cloth. When looked closely at the triboelectric process, and at very small distance $\Delta Z_P$ being of atomic dimensions, an electric dipole 107 is created with an electric field strength (dipole moment) that is proportional to the charge "q" (charges 103 or 104) and distance $\Delta Z_P$. The electric charges 103 and 104 of a created dipole 107 are graphically shown in FIG. 1B with the dipole electric field lines shown over the materials 101 and 102. Although only one dipole 107 is graphically shown many dipoles may exist simultaneously. By varying the distance, or the charge "q", the electric field strength of the dipole 107 is varied. For slowly varying distance $\Delta Z_P$, the electric field of the dipole 107 is electrostatic or quasi-static. For rapidly varying distance $\Delta Z_P$, the electric field of the dipole 107 is electrodynamic. When the distance $\Delta Z_P$ goes to zero, the dipole 107 may be annihilated as the charges return to their host materials 101 and 102. The electric potential and electric field emanating from a dipole 107 is a function of distance and angular orientation. Referring to FIG. 2, the dipole field orthogonal components at any point at the distance vector $\vec{r}$, are given by:

$$E_r = \frac{2p\cos(\theta)}{4\pi\epsilon_0 r^3}$$

$$E_\theta = \frac{p\sin(\theta)}{4\pi\epsilon_0 r^3}$$

$$E_\phi = 0$$

where p is the magnitude of the electric dipole moment, $p=q\Delta Z_p$ and $r=|\vec{r}|$.

Referring back to FIG. 1A, the designation $\Delta Z_P$ is used to denote atomic distances generated by phonon 108. For both macroscopic and atomic distances $\Delta Z_P$, dipoles 107 are created. However, other charge distributions generated may also contain other higher moments including a dipole moment, such as quadrupole, octupole, etc., due to the complex shape and charge distribution on macroscopic objects 101 and 102 and their respective surfaces. In some embodiments, other higher moments may be produced simultaneously by phonons creating dipoles. In some embodiments, the interface 106 may not be a free surface where the distortion of the electron clouds of the constitutive atoms at the interface 106 generates electric dipole and higher moment fields.

Figure 1B:
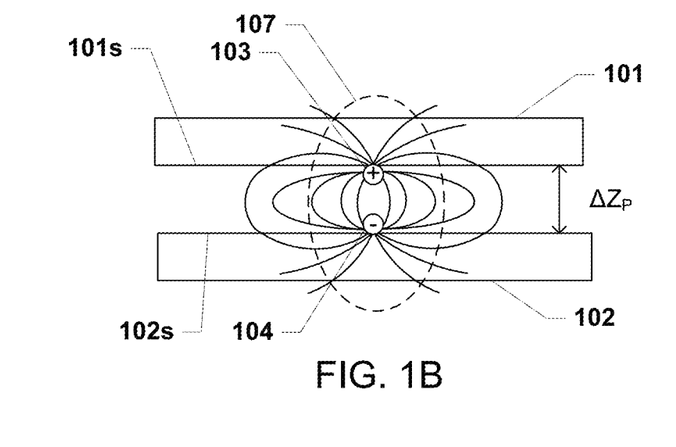
FIG. 1B is a block diagram showing the electric charges of a created dipole of FIG. 1A, consistent with one or more embodiments of the present disclosure.
Figure 2:
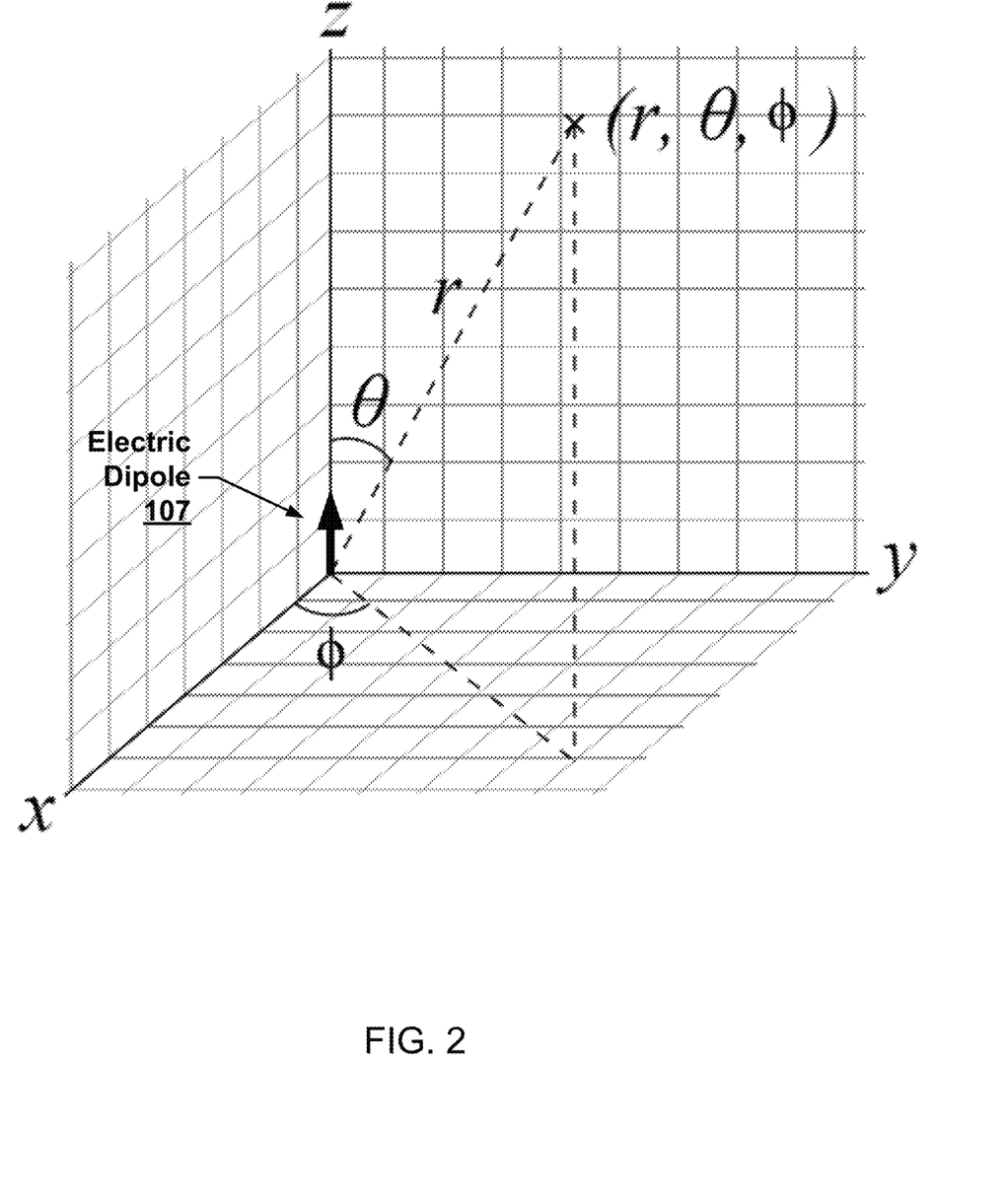
FIG. 2 is a graph of dipole field orthogonal components, consistent with one or more embodiments of the present disclosure.

The distance $\Delta Z_P$ shown in FIG. 1B is generally considered to be macroscopic for triboelectric charging as macroscopic distances are used to reveal the resulting electrically charged surfaces of dissimilar materials. In contrast, much smaller distances $\Delta Z_P$, that may be atomic in length and at surface and subsurface locations, may be dynamically changed by phonons 108 to create and annihilate and control properties of electrical dipoles 107 by changing $\Delta Z_P$. Referring to FIGS. 1A and 1B, and as an example, if the subsurface distance $\Delta Z_P$ at the interface of material 101 and material 102 is made non-zero, then triboelectric charging will create local electric dipoles 107 that are internal and on sub-surfaces 101s and 102s. If the interface of material 101 and material 102 is already non-zero, and an electric dipole 107 is already present, then the distance $\Delta Z_P$ between interface of material 101 and material 102 may be changed to vary the dipole strength and alignment.

Figure 3A:
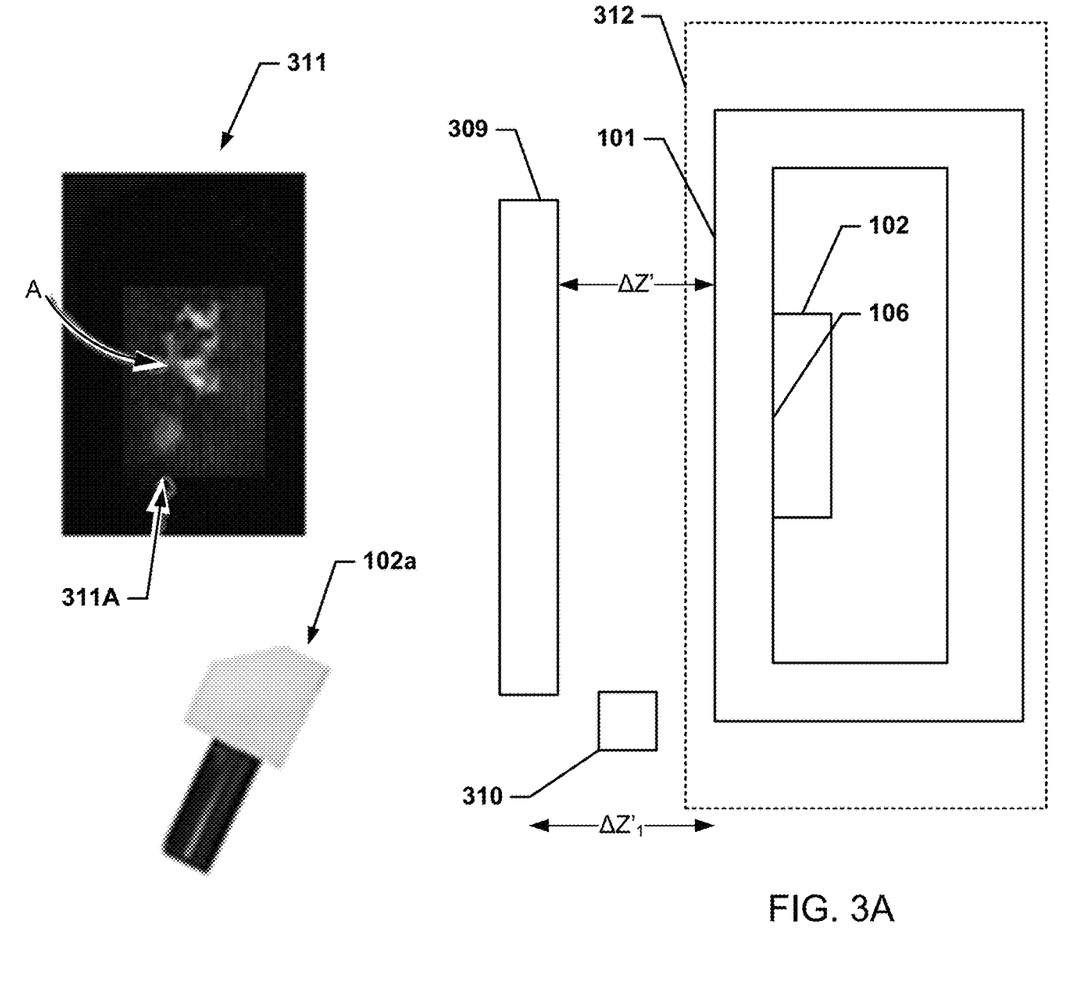
FIG. 3A illustrates an embodiment system for phonon assisted creation and annihilation of variable strength and variable alignment subsurface electric dipoles, consistent with one or more embodiments of the present disclosure.

Phonons 108 may be used to vary the distance $\Delta Z_P$ from zero to a non-zero value as shown in FIG. 1A. FIG. 3A illustrates an embodiment system for phonon assisted creation and annihilation of variable strength and variable alignment subsurface electric dipoles. The phonons 108 may be generated external to the surface of an object 312 including material 101 and material 102. The phonons 108 may be generated by phonon source 310 that may be a non-contact device, for example, an air coupled ultrasonic transducer, sound speaker in air, etc., or a contact device may be used such as ultrasonic transducer or mechanical vibration system in contact with the object 312 including material 101 and material 102. The phonon source 310 may be a movable scanning source.

An electric potential and electric field measurement system in a two dimensional array configuration may be used to measure the electric potential and electric field external to objects in real-time. Measurements may be made without phonon excitation and with phonons present. FIG. 3A shows an example configuration of a two-dimensional imaging array 309, such as a two dimensional electric potential imaging array or two dimensional electric field imaging array, placed a distance $\Delta Z'$ from the object 312 including material 101 and material 102, and the phonon source 310. As an example, material 101 may be a container or wall that encloses or hides material 102. There may be other objects in container of material 101 or object 312. The phonon source 310 may or may not be in physical contact with material 101. The phonon source 310 may be inside material 101. The phonon source 310 may be remote from material 101. Other objects with interfaces between or within them may be present in a container of material 101.

Referring to FIG. 3A, as an example, measurement of the electric potential with and without phonon excitation may be made remotely, by use of imaging array 309 placed a distance $\Delta Z'$ from material 101. The imaging array 309 may be any type imaging array, such as a single element measurement array or multi-element imaging array, and any type imaging array 309 may also be used to make measurements. As examples, the array design and acquisition and data analyses employed by the imaging array 309 may be performed according to the methods described in U.S. Published Patent Application No. 2012/0199755, U.S. Published Patent Application No. 2015/0137825, and U.S. patent application Ser. No. 15/177,798 filed Jun. 9, 2016, which are hereby incorporated by reference herein in their entirety for all purposes. In some embodiments, the imaging array 309 may be an electric potential imaging array. Additionally or alternatively, in some embodiments, the imaging array 309 may be an electric field imaging array. At time $\tau>0.0$, the phonon source 310 may generate phonons 108 having a frequency $\nu$ (wavelength $\lambda$) or a distribution of frequencies or wavelengths in material 101. The phonons 108 may propagate into other adjacent materials. The electric potential at a time $\tau>0.0$ is measured by the array 309 at a distance $\Delta Z'$ from the surface and parallel to the surface of material 101. The electric potential image 311 at the array 309 position may be generated and displayed on a monitor. From the electric potential measured by the imaging array 309, the electric field components may be determined and imaged. Any method may be used for determining electric field components from electric potential data, such as by differencing electric potentials as described in U.S. patent application Ser. No. 15/637,673, titled DYNAMIC MULTIDIMENSIONAL ELECTRIC POTENTIAL AND ELECTRIC FIELD QUANTITATIVE MEASUREMENT SYSTEM AND METHOD, and filed Jun. 29, 2017, which is incorporated by reference herein in its entirety for all purposes. If electric potential data is taken at one $\Delta Z'$ distance from material 101, the electric field X and Y components may be determined everywhere at any point in the plane of the array 309. If electric potential data is taken at two different $\Delta Z'$ distances from material 101, the electric field X, Y, and Z components may be determined everywhere at any point in the plane of the array 309. While a parallel arrangement is illustrated in FIG. 3A, other non-parallel type arrangements may be substituted for such a parallel arrangement in one or more embodiments.

Figure 3B:
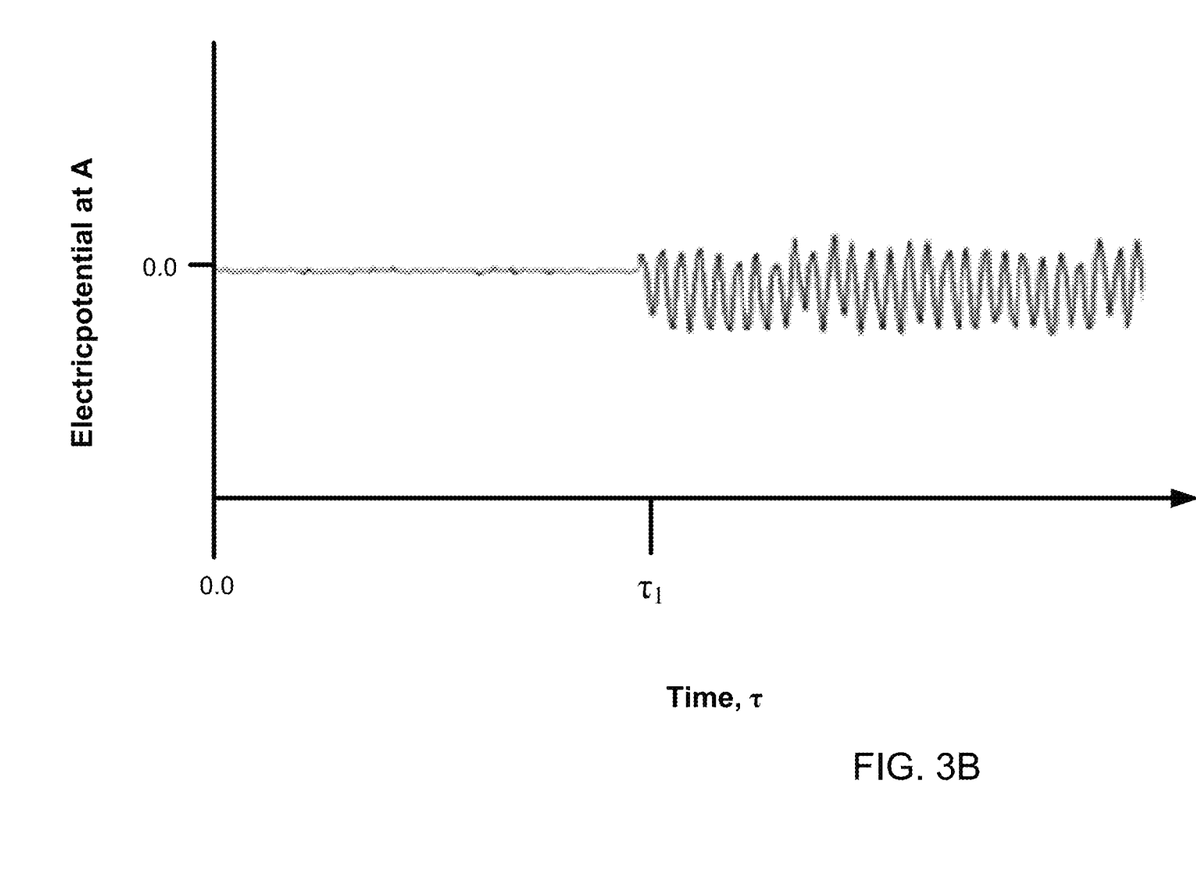
FIG. 3B is a graph of an electric potential waveform at a point, consistent with one or more embodiments of the present disclosure.

An optical image 102a of material 102, for example a three dimensional (3D) printed acrylonitrile butadiene styrene (ABS) polymer gun, as viewed from the position of the array 309 along the $\Delta Z$ axis toward material 101 is shown for comparison and as a demonstration of the electric potential imaging enabled by the various embodiments. The electric potential of dipoles 311A created at the subsurface interface 106 by the phonons 108 is measured as a function of time. FIG. 3A shows a linear grayscale representation of the electrical potential in image 311 measured a time $\tau_1>0.0$, where the dark shade represents high potential and lightest shade represents low potential. A typical electric potential waveform at a point "A" at time $\tau=0.0$, when a phonon is not present is shown in FIG. 3B. A typical electrical potential waveform at a point A at time $\tau_1>0.0$, when a phonon having a frequency of 180 Hz is present, is also shown in FIG. 3B. The low potential of the oscillating waveform in FIG. 3B corresponds to the lighter shaded region at point A of the electrical potential image 311 shown in FIG. 3A. The electric potential from the created dipole oscillates in potential as long as the phonon is present, and the dipole oscillation in potential is at the phonon frequency. The amplitude and phase of the potential oscillations and the dipole moment vector may be adjusted, for example, by selection of materials supporting the phonon, the surface topologies, the phonon polarization, the phonon amplitude, or a combination thereof. In various embodiments, the electric potential measurements as a function of time maybe used to generate a video for enhanced characterization of objects. The electric potential measurement may also include higher order electric potential moments. The measurement acquisition times may be in synchronization with the phonon frequency to produce apparent still images of the electric potential at a different position distance $\Delta Z'$. $\Delta Z'$ may be varied to measure the electric potential at $\Delta Z'_1$ providing sufficient measurement information to determine the electric field vector everywhere over the plane of the array and at the position $\Delta Z'$ due to the dipole field emanating from interface 106.

The phonon frequency may extend from infrasonic, subsonic through acoustic to ultrasonic, and extends to optical frequencies. At low frequencies (e.g., mechanical vibrations) dipoles are created, modulate in strength, and are annihilated at static and quasi-static frequencies. At higher frequencies (e.g., ultrasonic frequencies) dipoles are created, modulate in strength, are annihilated at electrodynamic frequencies and the electric potential is measurable. The phonon frequency does not need to be repetitive and partial cycles may be used.

Figure 4:
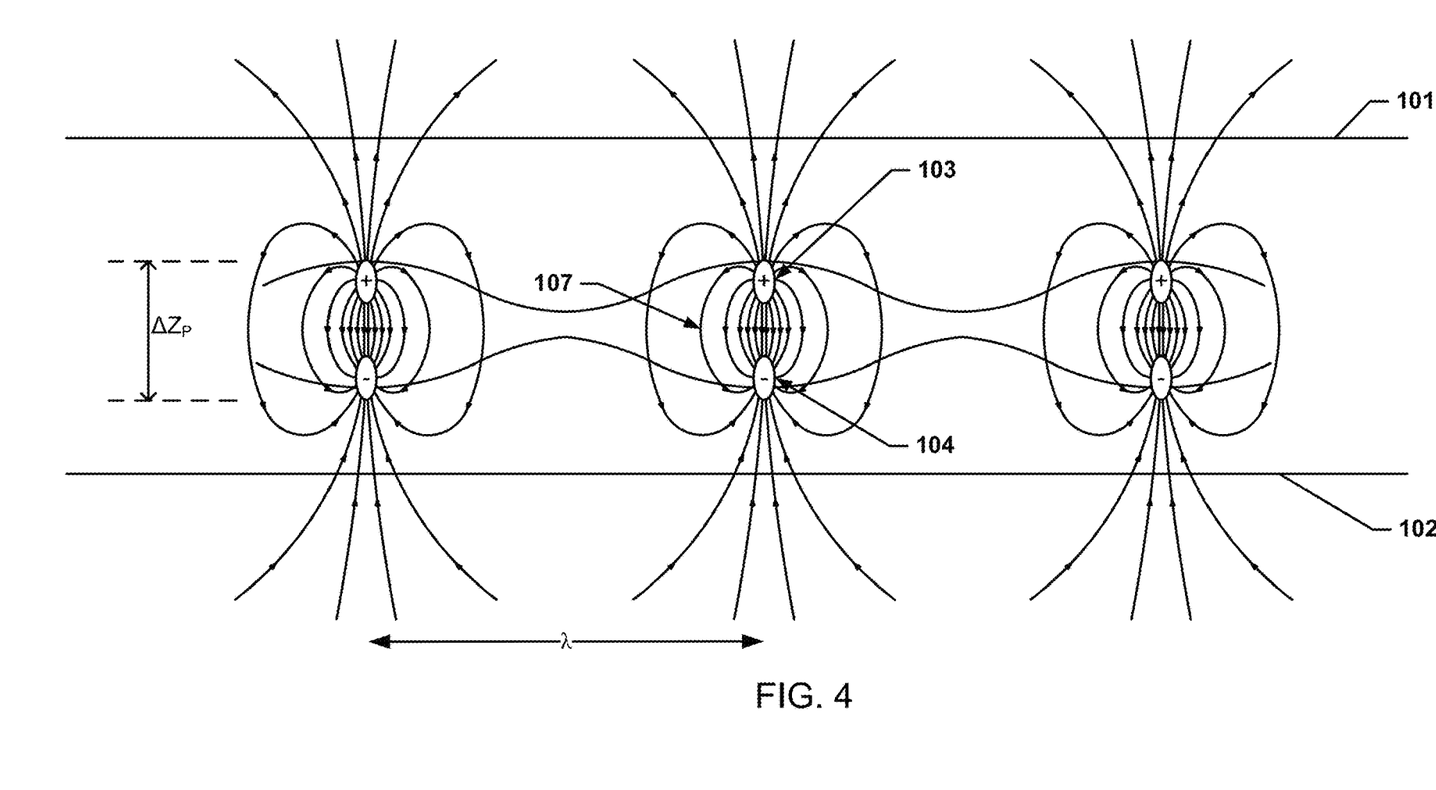
FIGS. 4, 5, and 6 illustrate example electric dipole fields that may be generated according to one or more embodiments of the present disclosure.
Figure 5:
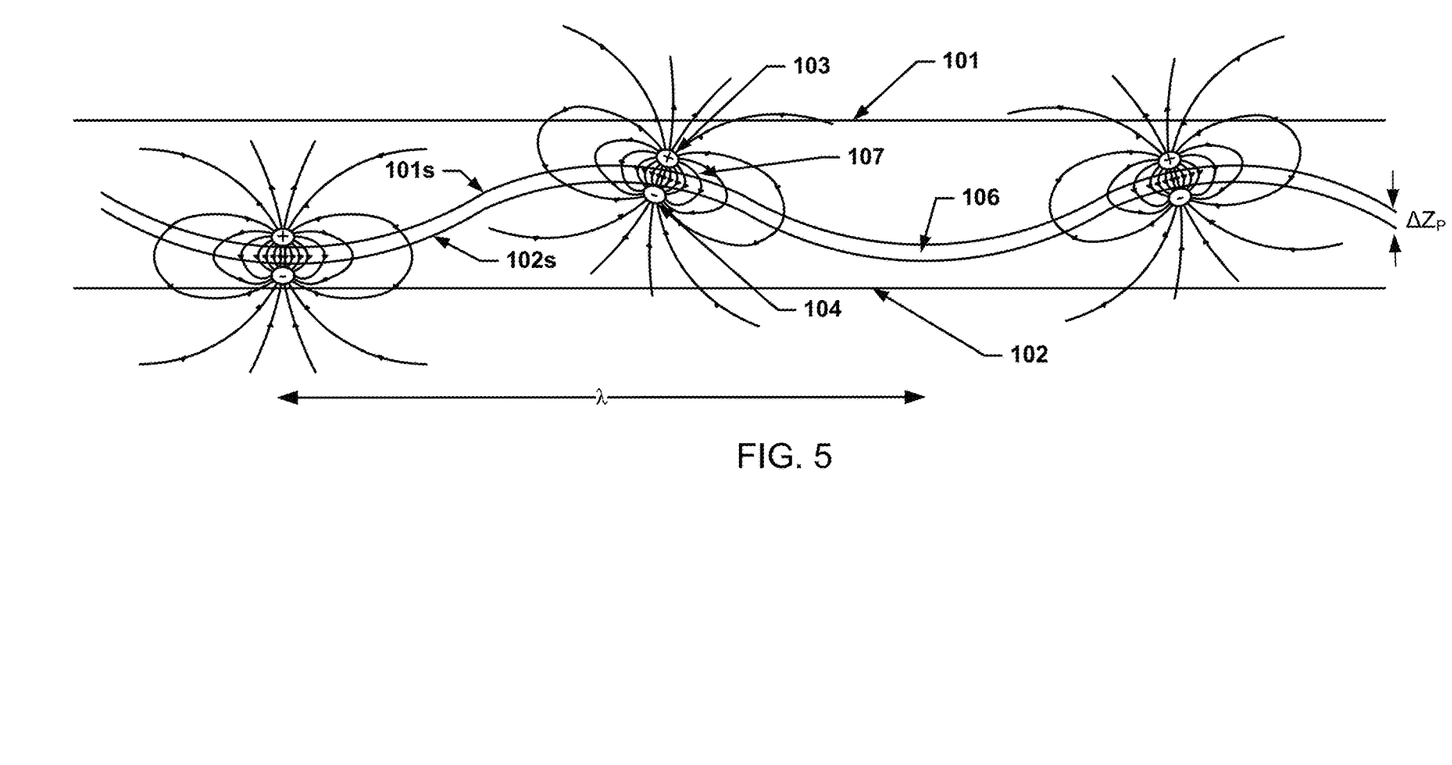
Figure 6:
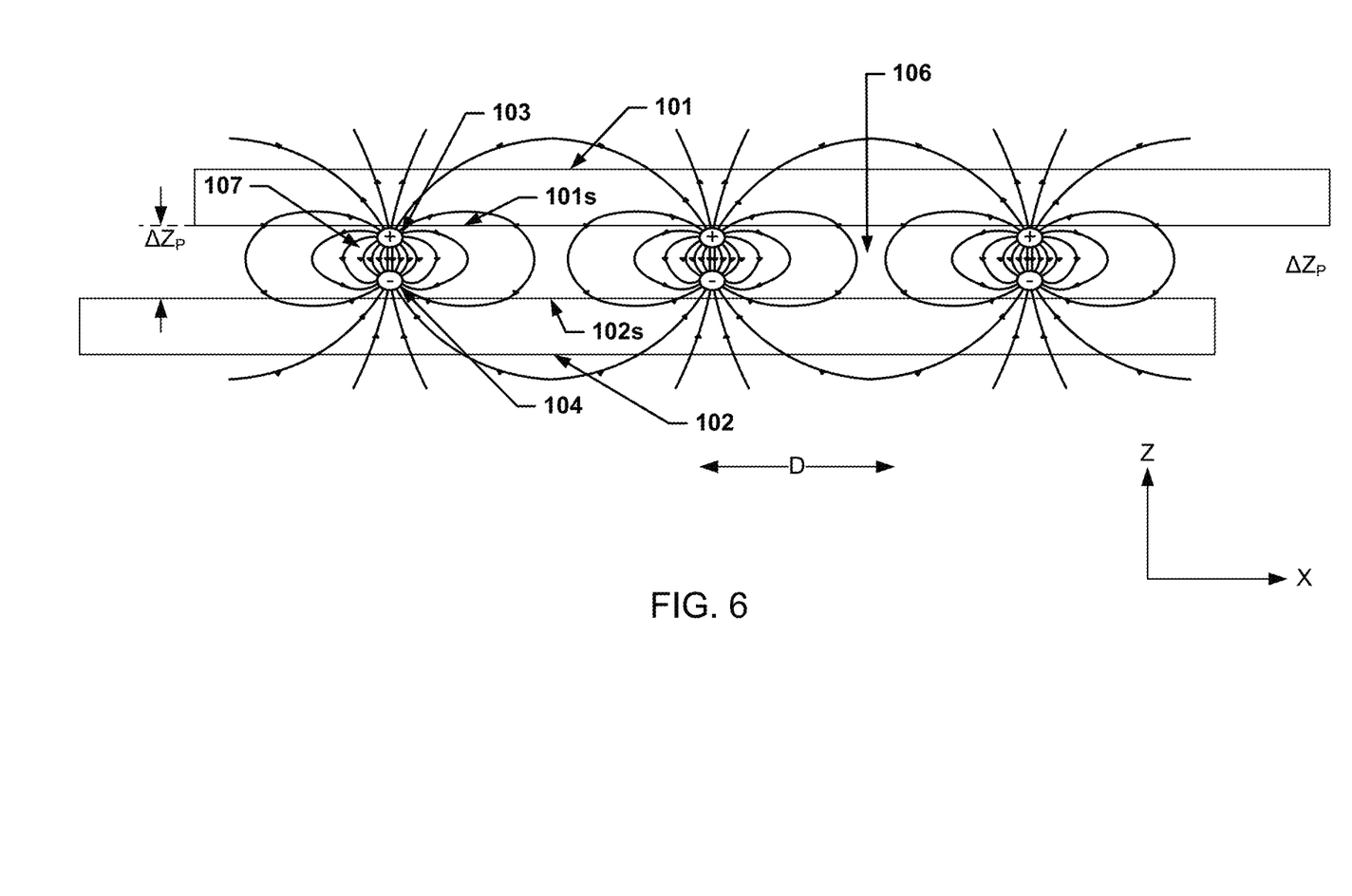

In one or more embodiments, the phonon frequency may be adjusted for specific applications, for example, so that electrically non-conductive materials 101 and 102 have periodic and momentary contact during phonon excitation. Examples of electrically non-conductive materials may include paper, glass, wood, polyurethane, silicone rubber, and Teflon. FIG. 4 shows the asymmetric surface displacement $\Delta Zp$ for a phonon creating an arrayed electric dipole 107 field that is ephemeral and exists only when the phonons are present. FIG. 5 shows the symmetric surface displacement $\Delta Zp$ for phonons creating an arrayed electric dipole 107 field with distributed orientation that is ephemeral and exists only when the phonons are present. The dipole 107 orientation may also be controlled by topology of the phonon distorted or designed surfaces as shown in FIG. 5. The phonons may be polarized and with longitudinal and shear displacements allowing a wide variation in control of the displacement $\Delta Zp$. FIG. 6 shows the displacement in the direction D along the X direction for a shearing phonon generating dipoles 107 along the interface 106.

In various embodiments, the electric field from an ephemeral array may be used to transmit electrodynamic waves in a preferred direction or specified directivity. A unique advantage of using an ephemeral generated dipole array for transmission may be that for the same frequency of transmission, the phonon frequency, for example, and with polymer materials 101 and 102, the length of the dipole array generated may be reduced by a ratio of the phonon to metal wire transmission velocities. A transmission polymer phonon based dipole array may be about $10^{-5}$ smaller than that required for equivalent wavelength conventional metallic transmission systems.

In various embodiments, there may be more than two dissimilar surfaces and more than two dissimilar materials so that three dimensional arrays of dipoles may be constructed. The interface between surfaces 101s and 102s does not need to be flat and parallel and complex interface topologies may be used to enhance dipole strength and direction and periodicity in various embodiments. The surfaces 101s and 102s may be material graded at atomic dimensions and in depth and along the surfaces exhibit local variations in triboelectric affinity. In various embodiments, the surfaces 101s and 102s may be electrically conductive and have a non-zero triboelectric affinity.

In some embodiments, phonons may be generated using multiple methods to create movement between surfaces 101s and 102s to produce electrical dipoles and higher moments within a material or at material interface surfaces. In some implementations, more than one phonon generating method may be used simultaneously.

The generation of electric dipoles in bulk material may not be triboelectric favored due to the lack of a free surface, however, the process of creating an interface or free surface 106 in bulk materials generates topologically rough surfaces, as well as displaced atoms, thereby yielding interface 106 surfaces that are no longer electronically equivalent to the host materials 101 and 102, and thereby creating, effectively dissimilar materials surfaces 101s and 102s that support triboelectric charging and the creation of dipoles 107.

In various embodiments, the phonon generated charge distribution created at surfaces 101s and 102s may be complex and not a pure dipole. While not a pure dipole, the electric potential and field from these more complex charge distributions may be measured and treated in a similar manner to dipoles as discussed herein.

Figure 7:
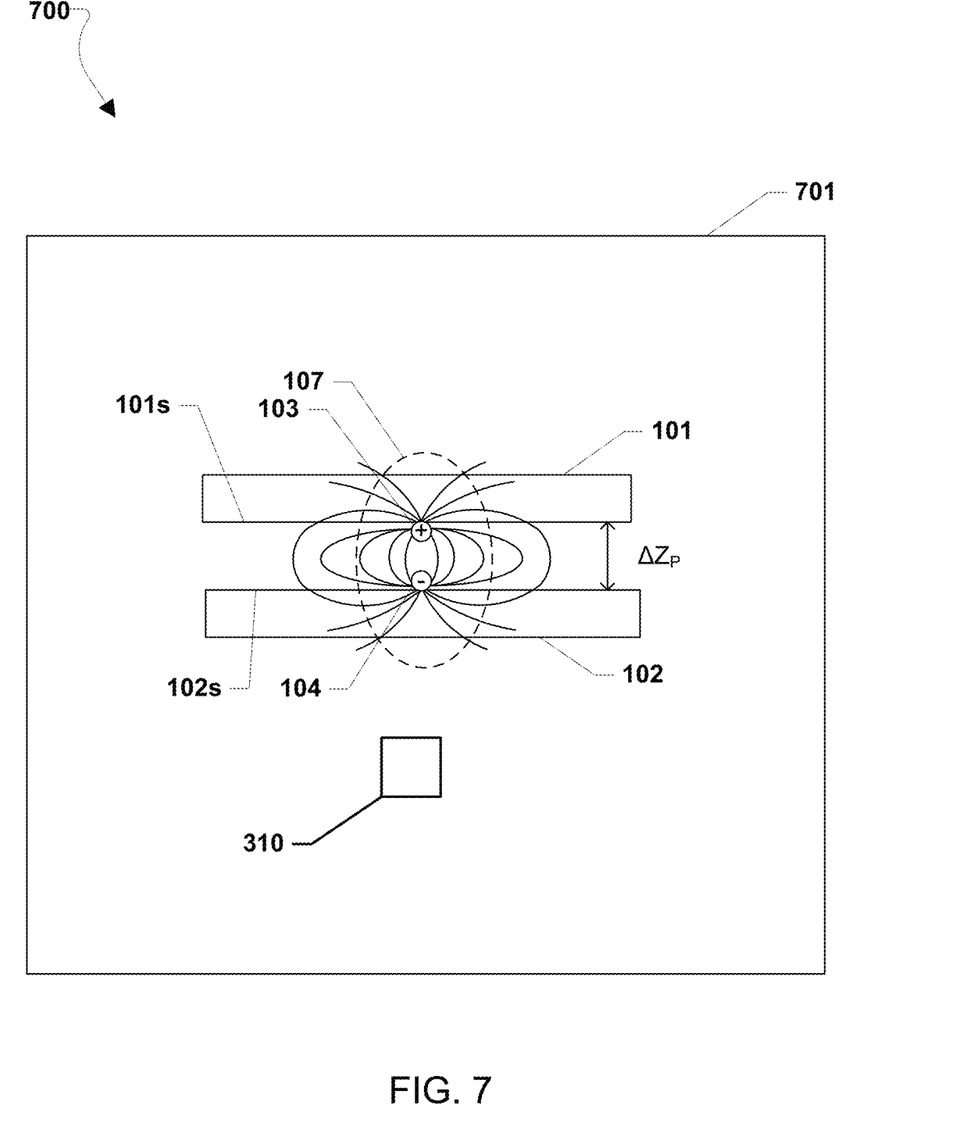
FIG. 7 illustrates an example antenna system, consistent with one or more embodiments of the present disclosure.

FIG. 7 illustrates an example antenna system 700, consistent with one or more embodiments of the present disclosure. The antenna system 700 may include components of FIG. 1B described above including two materials 101 and 102, as well as a phonon source 310 described above with reference to FIG. 3A, all supported on an antenna frame 701.

The two materials 101 and 102 may be supported on the antenna frame 701 such that momentary contact between the materials 101 and 102 occurs, for example $\Delta Z_P$ may be reduced to zero and then increase to a value above zero. The two materials 101 and 102 may be nonconductive antenna elements that generate and/or receive electrodynamic waves. The phonon source 310 may generate phonons directed at the materials 101 and 102, and the generated phonons may cause the materials 101 and 102 to have momentary contact during phonon excitation. In some various embodiments, the phonon frequency may be adjusted for specific applications, for example, so that electrically non-conductive materials 101 and 102 have periodic and momentary contact during phonon excitation. The electric potential from the created dipole oscillates in potential as long as the phonon is present, and the dipole oscillation in potential is at the phonon frequency. The amplitude and phase of the potential oscillations and the dipole moment vector may be adjusted by selection of materials supporting the phonon, the surface topologies, the phonon polarization, and the phonon amplitude. The phonons may be polarized and with longitudinal and shear displacements allowing a wide variation in control of the displacement $\Delta Zp$. In various embodiments, the antenna system 700 may be an ephemeral generated dipole array and the electric field from the antenna system 700 may be used to transmit electrodynamic waves in a preferred direction or specified directivity. A unique advantage of using an ephemeral generated dipole array for transmission may be that for the same frequency of transmission, the phonon frequency, for example, and with polymer materials 101 and 102, the length of the dipole array generated may be reduced by a ratio of the phonon to metal wire transmission velocities. A transmission polymer phonon based dipole array may be about $10^{-5}$ smaller than that required for equivalent wavelength conventional metallic transmission systems. In one or more embodiments, the antenna system 700 may generate and/or receive directed and omni-directional variable amplitude and frequency transmission waves without the need for conductive antennas and may have a dimension several orders of magnitude smaller than existing antennas configured to generate and/or receive waves of the same amplitudes and frequencies.

It will be readily understood that the components of various embodiments of the present disclosure, as generally described and illustrated in the figures herein, may be arranged and designed in a wide variety of different configurations. Thus, the detailed description of the embodiments of the present disclosure, as represented in the attached figures, is not intended to limit the scope of the invention as claimed, but is merely representative of selected embodiments.

The features, structures, or characteristics of the present disclosure may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages should be or are present in any single embodiment of the present disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment. Furthermore, features, advantages, and characteristics described herein may be combined in any suitable manner in one or more embodiments. For example, although aspects and features may in some cases be described in individual figures, it will be appreciated that features from one figure can be combined with features of another figure even though the combination is not explicitly shown or explicitly described as a combination. Moreover, one skilled in the relevant art will recognize that the invention can be practiced without one or more of the specific features or advantages of a particular embodiment illustrated in the figures or described herein. In other instances, additional features and advantages may be recognized in certain embodiments that may not be present in all embodiments of the present disclosure. One having ordinary skill in the art will readily understand that the one or more embodiments as discussed herein may be practiced with steps in a different order, and/or with hardware elements in configurations which are different than those which are disclosed.

Other aspects and embodiments may will be apparent from consideration of the specification. It is intended that the specification and illustrated embodiments be considered as examples only with a true scope of the invention being indicated by the following-claims.

What is claimed is:

1. A system for characterizing objects, comprising:
   a phonon generation source; and
   an imaging array,
   wherein the phonon generation source is configured to propagate phonons into an object comprising two electrically non-conducting materials to generate a triboelectric charge at a boundary between the two non-conductive materials while the imaging array generates one or more electric potential images of an interface between the two electrically non-conducting materials of the object from which electric field components are determined and imaged, and
   wherein the imaging array is a multi-element electric potential measurement array.

2. The system of claim 1, wherein the phonon generation source is a contact device.

3. The system of claim 2, wherein the phonon generation source is an ultrasonic transducer or mechanical vibration system.

4. The system of claim 1, wherein the phonon generation source is a non-contact device.

5. The system of claim 4, wherein the phonon generation source is an air coupled ultrasonic transducer or sound speaker.

6. The system of claim 5, wherein the propagated phonons have a distribution of frequencies.

7. The system of claim 6, wherein the distribution of frequencies is an infrasonic distribution of frequencies, acoustic distribution of frequencies, subsonic distribution of frequencies, ultrasonic distribution of frequencies, or optical distribution of frequencies.

8. The system of claim 1, wherein the imaging array is a single element electric potential measurement array.

9. The system of claim 1, wherein the electrically non-conductive material is paper, glass, wood, polyurethane, silicone rubber, or Teflon.

10. A method for characterizing objects, comprising:
    propagating phonons into an object comprising two electrically non-conducting materials using a phonon generation source to generate a triboelectric charge at a boundary between the two non-conductive materials;
    measuring electric potential using an imaging array while propagating the phonons; and
    generating one or more electric potential or electric field images of an interface between the two electrically non-conducting materials of the object based on the measured electric potentials; and
    wherein the imaging array is a multi-element electric potential measurement array.

11. The method of claim 10, wherein the phonon generation source is a contact device.

12. The method of claim 11, wherein the phonon generation source is an ultrasonic transducer or mechanical vibration system.

13. The method of claim 10, wherein the phonon generation source is a non-contact device.

14. The method of claim 13, wherein the phonon generation source is an air coupled ultrasonic transducer or sound speaker.

15. The method of claim 14, further comprising propagating the phonons at a single frequency.

16. The method of claim 14, further comprising propagating the phonons at a distribution of frequencies.

17. The method of claim 16, wherein the distribution of frequencies is an infrasonic distribution of frequencies, acoustic distribution of frequencies, subsonic distribution of frequencies, ultrasonic distribution of frequencies, optical distribution of frequencies, or a combination thereof.

18. The method of claim 14, wherein the electrically non-conductive material is paper, glass, wood, polyurethane, silicone rubber, or Teflon.

19. The method of claim 10, wherein the imaging array is a single element electric potential measurement array.

* * * * *